July 3, 1962  G. H. SCHURGER ET AL  3,041,940
MACHINE TOOL
Original Filed Sept. 5, 1956  7 Sheets-Sheet 1
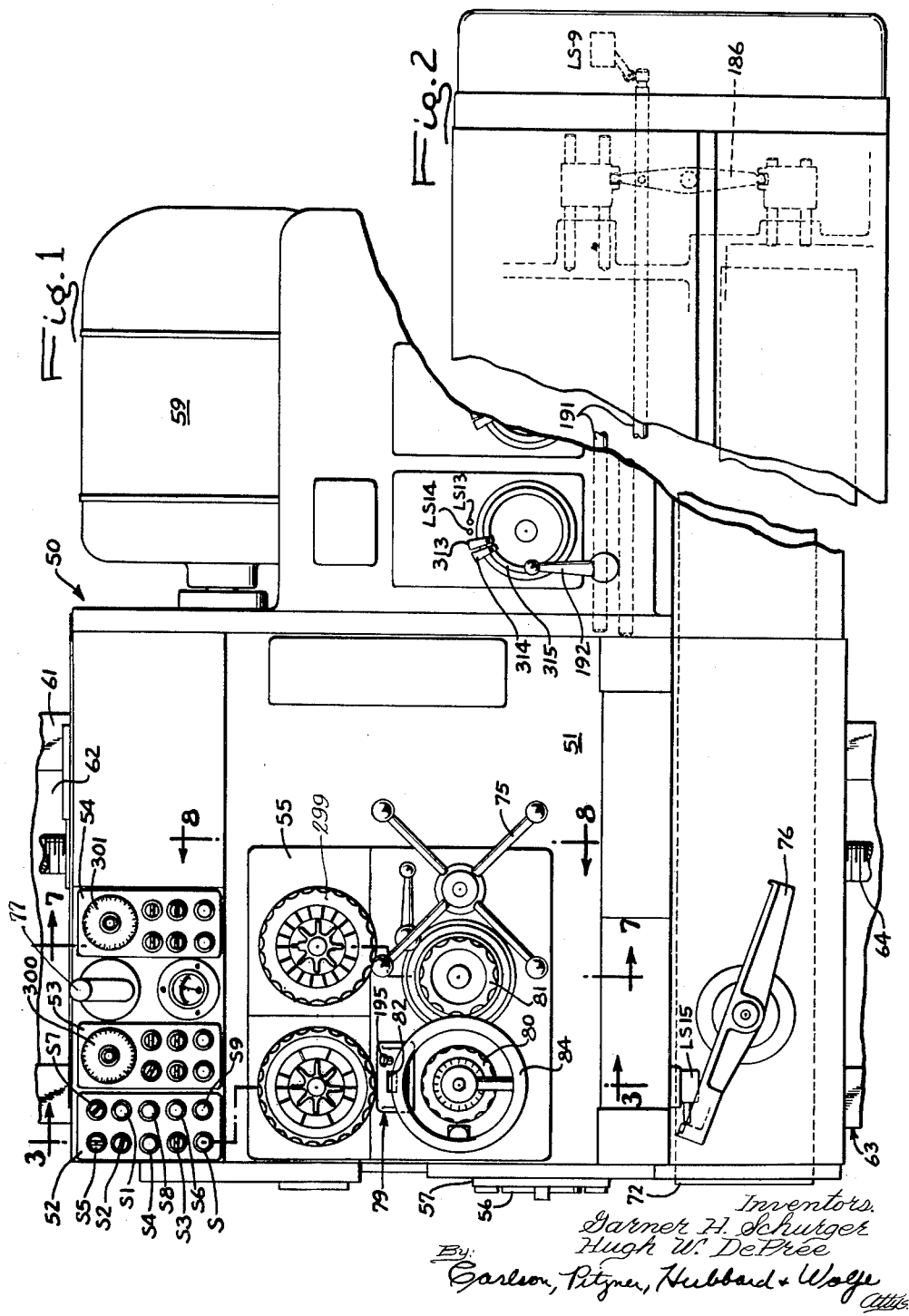
Inventors.
Garner H. Schurger
Hugh W. DePree
By: Carlson, Pitzner, Hubbard & Wolfe
Attys.

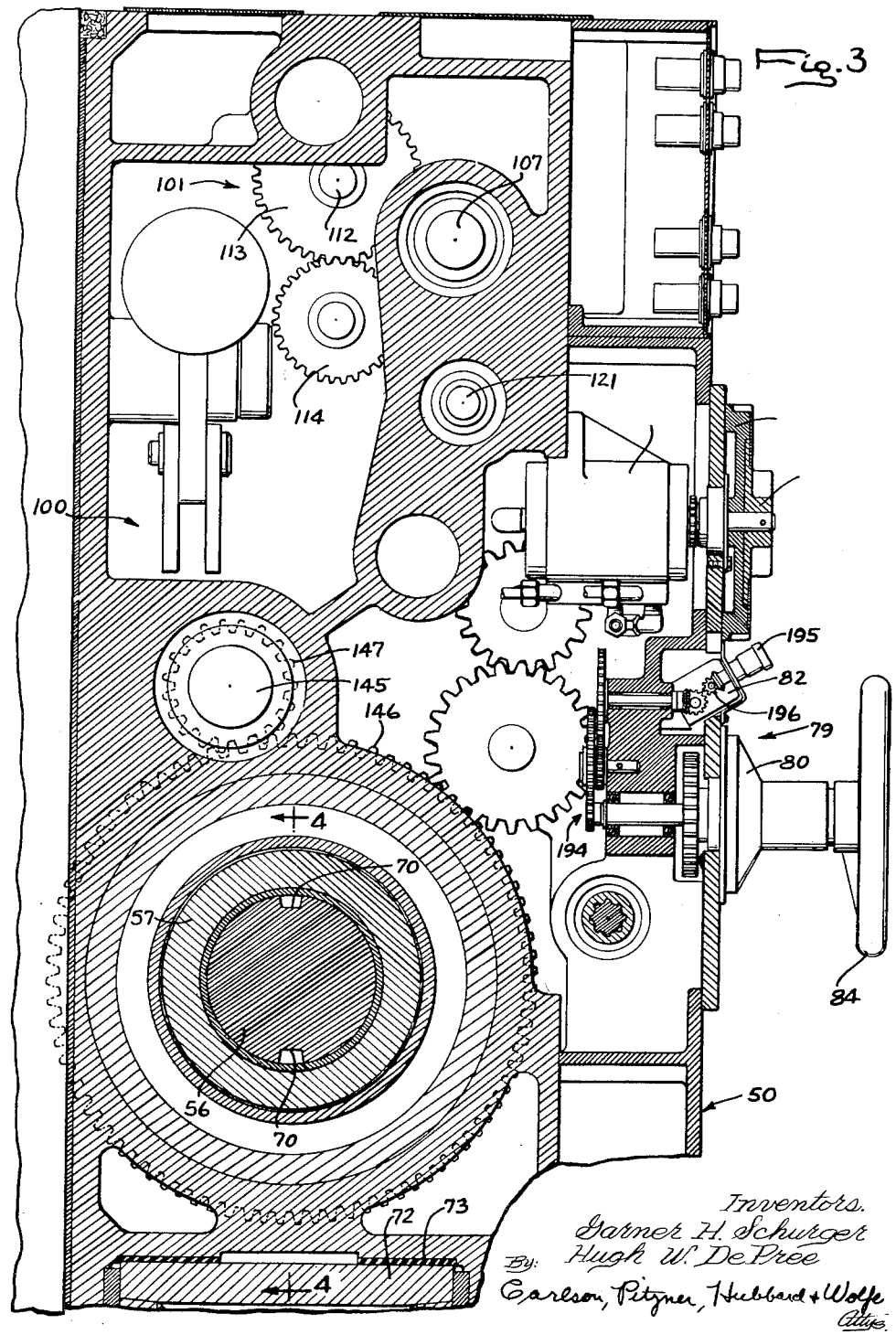

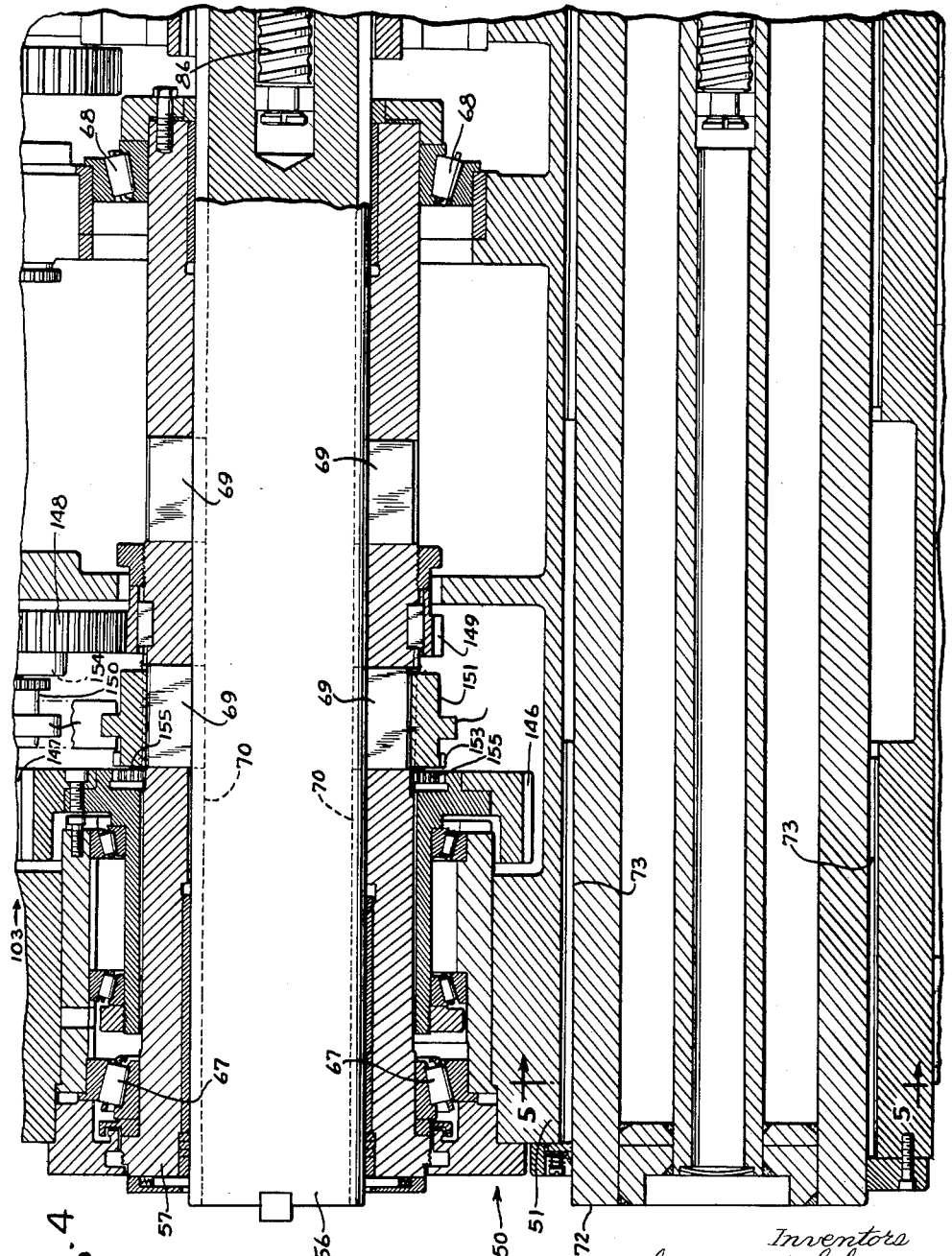

July 3, 1962 G. H. SCHURGER ET AL 3,041,940
MACHINE TOOL
Original Filed Sept. 5, 1956 7 Sheets-Sheet 4
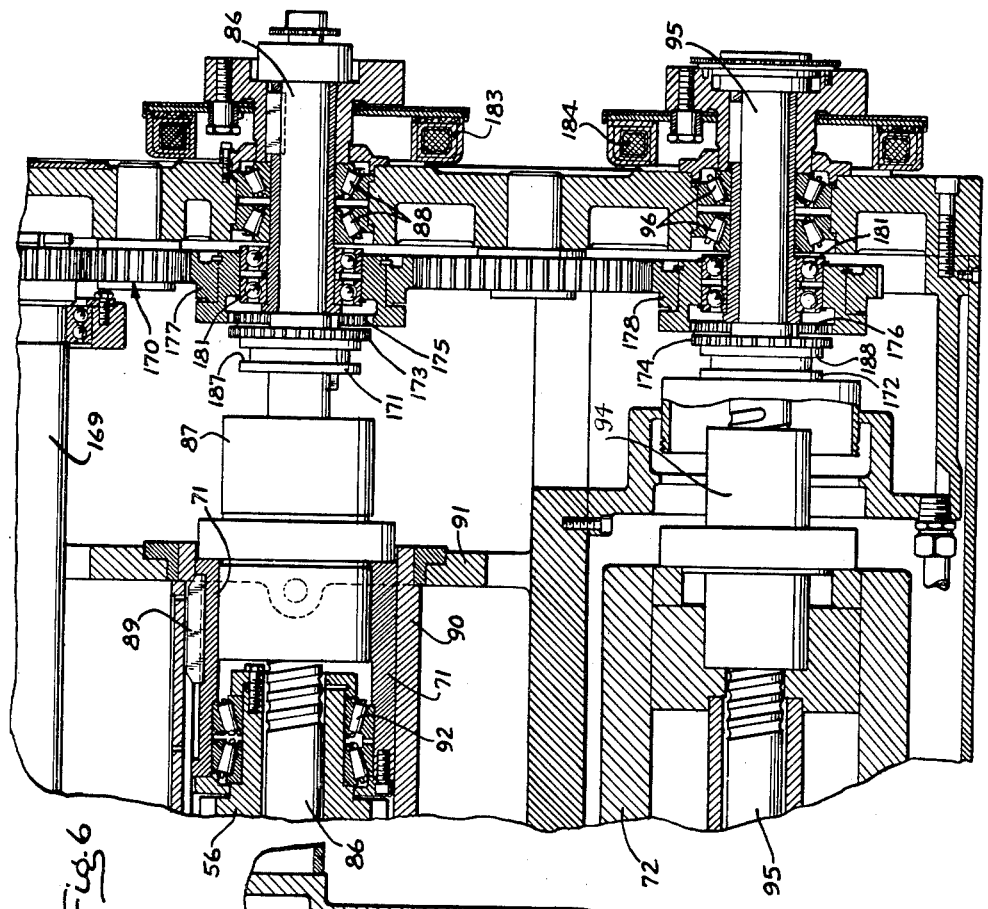
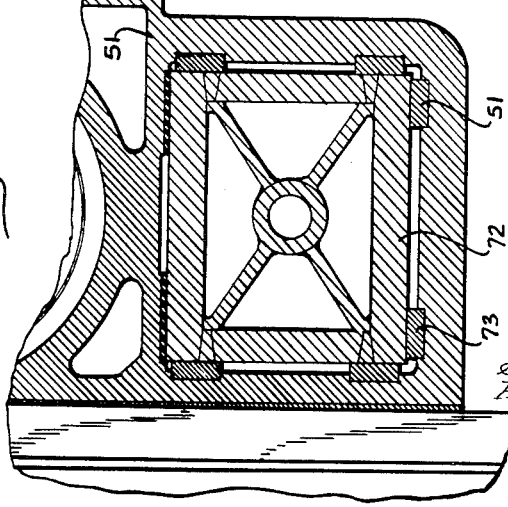
Inventors.
Garner H. Schurger
Hugh W. DeFree
By Carlson, Pitzner,
Hubbard, & Wolfe
Attys.

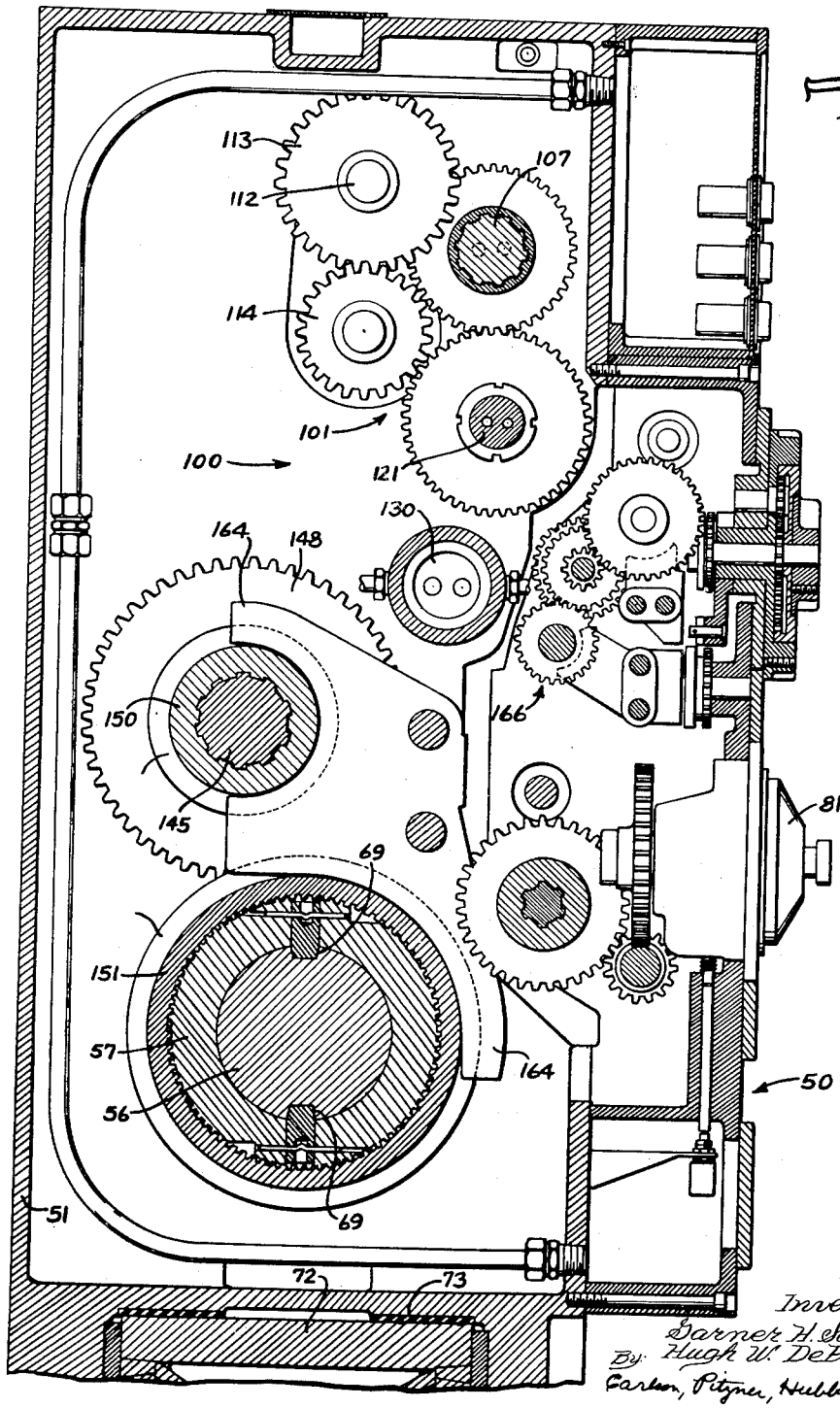

July 3, 1962 G. H. SCHURGER ET AL 3,041,940
MACHINE TOOL
Original Filed Sept. 5, 1956 7 Sheets-Sheet 6

Inventors.
Garner H. Schurger
Hugh W. DePree
By: Carlson, Pitzner, Hubbard & Wolfe
Attys.

United States Patent Office 3,041,940
Patented July 3, 1962

3,041,940
MACHINE TOOL
Garner H. Schurger, Fond du Lac, and Hugh W. De Pree, Milwaukee, Wis., assignors to Giddings & Lewis Machine Tool Company, Fond du Lac, Wis., a corporation of Wisconsin
Original application Sept. 5, 1956, Ser. No. 608,061, now Patent No. 2,984,159, dated May 16, 1961. Divided and this application Jan. 15, 1958, Ser. No. 709,062
1 Claim. (Cl. 90—14)

The present invention relates to machine tools of the horizontal boring, milling and drilling type.

One object of the present invention is to provide an improved headstock of the type indicated which affords an enlarged flexibility of control when carrying out various machining operations, and which is adaptable for carrying out shaping operations.

Another object of the present invention is to provide a headstock of the foregoing characteristics which is of structurally strong and rigid construction and which retains the simplicity and ease of operation desirable in such a machine tool.

Other objects and advantages will become apparent as the following description proceeds, taken in connection with the accompanying drawings wherein:

FIGURE 1 is a front view of a headstock illustrative of the present invention and showing its control panels;

FIG. 2 is a fragmentary front view of a portion of the headstock illustrated in FIG. 1 and showing the shifting mechanism for the spindle and underarm carried thereby;

FIG. 3 is a section view taken substantially in the plane of line 3—3 of FIG. 1 and showing a portion of the transmission enclosed within the headstock;

FIG. 4 is a section view taken substantially in the plane of line 4—4 of FIG. 3 and showing the spindle and underarm in more detail;

FIG. 5 is a section view taken substantially in the plane of line 5—5 of FIG. 4 and showing the underarm and its support;

FIG. 7 is a section view taken substantially in the plane of line 7—7 of FIG. 1 and showing further the enclosed transmission;

FIG. 8 is a schematic representation of the transmission and hydraulic control system contained in the headstock shown in FIG. 1.

Figures 6, 10:
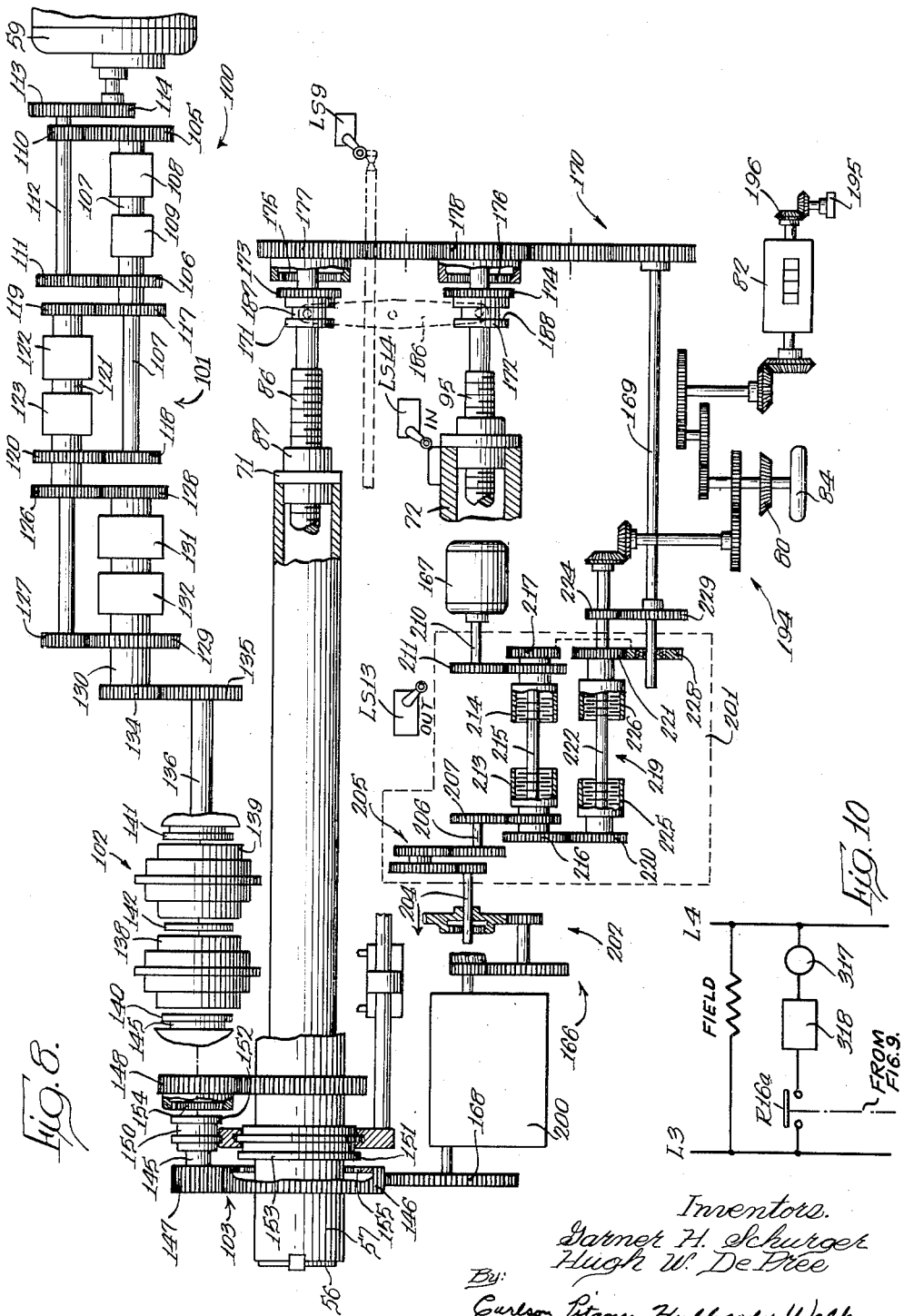
FIG. 6 is a section view taken in substantially the same plane as FIG. 4 but showing the spindle and underarm rams at the rear of the headstock.
FIG. 10 is a wiring diagram showing that portion of the electrical control circuit for controlling movement of the column along its bed in response to signals from the circuit shown in FIG. 9.

While a certain illustrative embodiment has been shown in the drawings and will be described below in considerable detail, there is no intention to limit the invention to the specific form disclosed but, on the contrary, the intention is to cover all modifications, alternatives, equivalents, and uses falling within the spirit and scope of the invention as expressed in the appended claim.

In General

Machines of the type upon which the headstock herein to be described is useful are commonly known to those skilled in the art as horizontal boring, milling and drilling machines. Briefly, these machines comprise a fixed bed mounted on a shop floor and having on its upper surface parallel ways carrying a column base or saddle. A vertical column is mounted on the upper surface of this base and supports by suitable vertical ways on one face a spindle headstock. To perform cutting operations on a workpiece, the workpiece is secured to a table or other support adjacent the headstock of the tool. The desired operations can then be performed on the workpiece by adjusting the position of the headstock, the column, and the cutting tool carried by the headstock.

Referring to FIG. 1 of the drawings, the headstock herein to be described is shown comprising a housing 51 having on its front face various control panels 52, 53, 54, 55. To support a cutting tool, the headstock includes a rotatable and translatable spindle 56 splined within a sleeve 57 journaled in the headstock. Suitable drive motors, one of which is shown generally at 59, are included on the headstock. The headstock is mounted on ways 61 on a vertical face 62 of the column 63 and is moved relative thereto by a suitable elevating screw 64 driven by a power mechanism (not shown) in the column 63 and threaded in a nut in the headstock. If desired, a platform on which the operator may stand can be attached to the headstock so that the operator is close to the controls and can devote his full time to the operation of the machine. By moving the headstock vertically along the face of the column, by moving the column horizontally along the machine tool bed, and by reciprocating and rotating the spindle in the headstock, three cutting dimensions are possible with the illustrated machine tool, making it extremely versatile and adapted for performing a multitude of operations on various sizes and shapes of workpiece.

In addition to the spindle, the headstock includes the controls for operating the machine as well as the power mechanisms for translating and rotating the spindle. On the remainder of the machine there is included the necessary electrical circuits, lubricating systems, cooling systems, and the like generally found on machines of this type. Inasmuch as this invention is concerned only with the headstock and its associated transmission and controls, the remaining portions of the horizontal boring, drilling and milling machine have not been shown.

The Headstock

Referring now to FIGS. 1 through 4, the headstock there shown comprises an internally partitioned housing 51 having journaled thereon and extending out one end thereof the spindle sleeve 57. The spindle sleeve (FIG. 4) is journaled in suitable bearings 67, 68 at its front and rear ends respectively in the housing 51. The sleeve carries centrally the tool spindle 56 which is keyed, as at 69, to the sleeve for axial but not rotary movement, suitable grooves 70 being provided in the spindle, so that rotation of the sleeve by a suitable transmission imparts rotary movement to the spindle. At the innermost end of the sleeve is a ram 71 (FIG. 6) for axially translating the spindle 56 into and out of the sleeve 57. Mounted directly beneath the spindle sleeve is an underarm 72 slidably supported in suitable bearings 73 within the spindle housing for axial movement into and out of the same. The underarm is intended for the purpose of supporting the spindle at its greater extensions and also various accessories fastened to the spindle. For a more complete description of the underarm and its uses, reference is hereby made to application Serial No. 395,464, filed December 1, 1953, now Patent No. 2,890,629.

Above the spindle and within the housing is located a transmission for feeding the spindel out of the sleeve and for rotating the sleeve to rotate the spindle. In order that the headstock be useful for a large number of machining operations, the transmission is adapted for numerous speeds and feeds. In the present transmission, to be described below, there is a possibility, for example, of thirty-two rotary spindle speeds and a much greater number of spindle feeds. Control of these speeds is accomplished through the control panels 52, 53, 54, 55 containing electrical switches and pushbuttons, on the front of the headstock 50. In a like manner, the feed of the spindle 56 into and out of the spindle sleeve and the feed of the underarm 72 into and out of the headstock housing 51 is controlled, as is the speed of the column and headstock feeds, through the panels.

Referring to FIG. 1, it can be seen that the housing also includes a pilot wheel 75 which is connected to the spindle feed transmission for manually feeding either the spindle or the underarm. Also on the headstock is a foot-operated clamp lever 76 for clamping the underarm to the housing when the underarm is being used to support an attachment such as an angular milling attachment. When the underarm is so used, feed of the cutting tool is obtained by moving either the headstock or the column.

For purposes of alining the spindle with the workpiece, suitable indicating devices are desirably provided. There is shown, for example, on the illustrative headstock, a telescope eyepiece 77 which is used to view a scale on the column for measuring vertical movement of the headstock on the column. A similar telescope (not shown) is used for viewing a suitable scale on the base of the machine. Also provided is a depth indicator shown generally at 79 for purposes of indicating the amount of projection of the spindle out of the headstock towards the workpiece. The depth indicator includes a pair of dials 80, 81 calibrated with vernier scales and with a rotary counter 82 for determining larger distances. Associated with one of the indicating dials is a hand wheel 84 used when a fine adjustment of the spindle projection is desired.

The spindle 56 of the illustrative headstock 50 (FIGS. 3 and 4) is mounted within a spindle sleeve 57. As described above, a pair of diametrically opposed slots 70 on the spindle 57 receive the keys 69 on the spindle sleeve for the purpose of splining the spindle to the sleeve. In this manner, rotary movement may be imparted to the spindle through the sleeve while allowing freedom of axial movement.

An axial thrust is imparted to the spindle by the ram 71 (FIG. 6). This is desirably accomplished by a screw 86 threaded in a ball bearing type nut 87 secured to the ram and journaled in bearings 88 in the headstock housing 51. The ram is keyed, as at 89, to a ram guide 90 secured to a partition 91 within the headstock housing 51 and is journaled to the inner end of the spindle by means of suitable thrust bearings 92. Upon rotation of the screw 86 in the ball bearing nut 87, the ram translates the spindle 56 axially of the spindle sleeve.

The underarm 72 is provided at its rearmost end with a ball bearing type nut 94 engaging a screw 95 rotatably mounted in bearing 96 in the headstock housing. Rotating the screw 95 by a suitable gear train axially translates the underarm 72 into and out of the headstock housing. In this instance, no underarm ram is required as the underarm is rectangular in cross section and does not rotate. The underarm itself is supported for axial translation by the bearing pads 73 secured to the internal walls of the headstock housing and serving as underarm guides.

Coolant and lubricant are circulated throughout the headstock housing which is sealed to prevent leakage. In this manner, the internally moving parts within the headstock are kept lubricated as well as cooled a suitable lubrication system (not shown) being provided on the column and column base.

As one feature of the headstock illustrative of the present invention and as shown in detail in FIG. 5, the underarm is supported in an integral casting forming a part of the headstock housing 51. In prior practice the underarm housing was formed as a separate unit and bolted to the headstock housing underneath the spindle and sleeve assembly. It has been discovered that by forming this underarm supporting housing as an integral casting with the headstock housing, rigidity and usefulness of the underarm has been increased many-fold.

*The Headstock Transmission*

In the successful performance of diverse machining operations with the horizontal boring, milling and drilling machine headstock of the present invention, the sleeve 57 carrying the spindle 56 must be susceptible of rotation at a great number of different speeds determined according to the workpiece and the particular operation being performed on it. The headstock is therefore provided with a multi-speed transmission, indicated generally as 100, organized so that spindle sleeve 57 is driven by the motor 59 in a selected one of a great number of speeds (in the present case thirty-two), such speeds being grouped as a plurality of high speeds and a greater plurality of low speeds. For this purpose there is provided in the headstock transmission 100, an eight-speed transmission 101 and a three-speed planetary speed reduction transmission 102, and a two-speed high-low back gear transmission 103. Provision is made for interconnecting the three transmissions 101, 102, 103 in tandem relation between the motor 59 and the spindle sleeve 57. Referring in particular to FIG. 8, there is shown the eight-speed transmission (indicated generally at 101) and the three-speed planetary transmission (indicated generally at 102), giving a total of twenty-four speeds, eight of which, however, are duplicates of the others.

Briefly, the eight-speed transmission 101 comprises a pair of gears 105, 106 rotatably mounted on a lay shaft 107 and adapted to be selectively fixed thereto by means of hydraulically actuated disc clutches 108, 109. Each of gears 105, 106 continuously meshes with corresponding gears 110, 111 on a shaft 112 drivingly connected through spur gears 113, 114 to the spindle sleeve motor 59. The shaft 107 has fixed thereto a pair of spaced gears 117, 118 which engage gears 119, 120 rotatably mounted on a second layshaft 121. A second pair of hydraulically actuated disc clutches 122, 123 is provided for selectively securing gears 119, 120 to shaft 121, thus providing a series of four speeds. The second layshaft 121 is in turn provided with a pair of output gears 126, 127 similarly meshing with a pair of gears 128, 129 rotatably mounted on a third shaft 130 and adapted to be selectively fixed thereto by a third set of hydraulically actuated disc clutches 131, 132. On this third shaft is an output gear 134 meshing with an input gear 135 on the input shaft 136 of the planetary transmission 102.

The planetary transmission is desirably of the type disclosed and claimed in copending application of John C. Hollis, Serial No. 397,410, filed December 10, 1953, to which reference is made for further detailed description. Suffice it here to say that there are two planetary gear trains in tandem, each being controlled by the movement of a ring gear, 138 and 139 (FIG. 9) respectively. Each ring gear is alternatively engageable with a respective stationary clutch gear 140, 141 fixed on the headstock housing or with a clutch gear 142 fixed to the planet carrier of the first planetary gear train. The input shaft 136 has fixed thereto the sungear of the first planetary gear train while the planet carrier of the second planetary gear train is fixed to an output shaft 145 (FIG. 3). The gears in the foregoing transmissions 101, 102 are dimensioned such that the output shaft is capable of rotating at twenty-four different speeds.

When the spindle sleeve is to be rotated by the transmission 100 at low speeds and high torque, a considerable radial thrust exists between the force transmitting gears. In order to prevent this force from being exerted on the spindle sleeve 57 with the consequent misalinement of the sleeve and the spindle 56 with respect to the headstock 50, a bullgear 146, constructed as described in copending application Serial No. 608,061, filed September 5, 1956, is employed for transmitting rotary torque to the spindle sleeve. So as to engage the bullgear 146, the output shaft 145 from the planetary transmission 102 has fixed thereto a pinion drive gear 147 of relatively great axial length to accommodate the high torque involved and adapted to mesh with the bullgear 146 surrounding the spindle sleeve 57. Rotatably mounted on the planetary transmission output shaft 145 is a second high-speed output gear 148 meshing with a gear 149 (FIG. 7) integral with the spindle sleeve and spaced thereon apart from the bullgear. Intermediate the gears 147, 148 on the planetary output shaft 145 and the gears 146, 149, on the spindle sleeve 57 are a pair of clutches 150, 151 splined to the output shaft 145 and to the spindle sleeve 57 respectively. The clutches 150, 151 are formed with external clutch teeth, 152, 153 respectively, engageable with internal clutch teeth 154, 155 on the corresponding high speed gear 148 and bullgear 146. The clutches 150, 151 are coupled together so that they are alternatively and not simultaneously engageable with their respective gears. Thus, when the spindle sleeve clutch 151 engages the bullgear 146, power is transmitted from the output shaft 145 through the gear 147 fixed thereto, to the bullgear 146, and thence through the clutch 151 to the spindle sleeve 57. On the other hand, if the clutch 150 on the planetary output shaft 145 engages with the spurgear 148 rotatably mounted on that shaft, power is transmitted from the planetary transmission 102 through the clutch 150 splined on the transmission shaft 145 to the spurgear 148, thence to the spurgear 149 fixed to the spindle sleeve 57.

As the headstock is presently designed, the latter gear train is considered the high-speed gear train, while the former or bullgear train, is employed for transmitting high torque at low speeds. The two-speed transmission 103 just described (high-speed, low torque and low-speed, high torque transmission) when joined in tandem with the twenty-four speed transmission portion previously described, affords a total of forty-eight output speeds. A number of these speeds are duplicates, however, because of the particular gear design and as a result, the present transmission 100 has a total of thirty-two different spindle sleeve speeds.

Simultaneous engagement of both clutches 150 and 151 to their respective gears is prevented by employing a single shifter fork 164 (FIG. 7) for shifting both of the clutches 150, 151 on the planetary output shaft 145 and the spindle sleeve 57 respectively. Thus, shifting of one clutch to its engaged position simultaneously disengages the other clutch so that only one set of gears, either the high-speed low torque gears 148—149, or the low-speed high torque gears 146—147 is engaged at one time.

*The Spindle and Underarm Feed Transmission*

Axial translation or feed of the spindle 56 and the underarm 72 is controlled through a feed transmission indicated generally at 166 (FIG. 8). In order to provide either a traverse speed or a lower cutting speed of the spindle or underarm, this transmission is driven by either a rapid traverse motor 167 or by a cutting speed gear train 168 leading from the bullgear 146 on the spindle sleeve 57 respectively, thus affording a large number of possible feed rates from which to select. The feed transmission 166 is connected through an output shaft 169 and a suitable gear train 170 alternatively to the spindle ram 71 or to the underarm 72 through their respective feed screws 86 and 95.

For selectively engaging the feed screws 86 and 95, each carries a gear clutch 171, 172 respectively splined thereon for axial movement. Each clutch has external gear teeth 173, 174 respectively engageable with corresponding internal gear teeth 175, 176 on output gears 177, 178 meshing with the gear train 170. Each input gear is journaled on the feed screws 86, 95 respectively by suitable bearings 181. For instantaneously halting rotation of feed screws 86, 95, an electric brake 183, 184 is provided on each of the feed screws 86, 95.

In order to prevent both the underarm and spindle feeds from being engaged at the same time, a rocking yoke assembly 186 pivoted intermediate its ends to the headstock engages annular grooves 187, 188 on the feed clutches 171, 172 (FIGS. 2 and 8). For shifting the rocking yoke 186, a rod 191 is pivoted thereto and is axially movable in the headstock by a handle 192 on the control panel (FIG. 2). When an appliance or auxiliary device is to be used and fastened to the underarm and the spindle, and the spindle feed clutch 171 is engaged, the spindle pulls the underarm out without necessitating the use of a positive drive for the latter. The ball bearing nut and screw feed being relatively frictionless, permit the underarm or the spindle to be moved even though the respective screw is not positively driven.

As an added feature of the present invention it has been discovered that by using the ball bearing nut and screw feed mechanism, the axial position of the spindle or the underarm can be accurately determined by measuring the amount of rotation of the feed screws 86, 95. To this end, the indicating mechanism or depth indicator 79 is connected directly to the feed transmission 166 through an indicator transmission or gear train, shown generally as 194. A reset knob 195 and gear 196 is included in the indicator transmission so that the counter may be set independently of the position of the spindle.

The gearing of the spindle and underarm feed transmission 166 is shown schematically in FIG. 8. Briefly, this transmission can be divided into two parts, a multi-speed feed rate selector transmission portion 200 and a direction and traverse selector transmission portion 201.

The feed rate transmission portion 200 can be of any gear construction known in the art and will generally provide a large number of feed rates from which to select. This gearing is connected to the take-off gear 168 meshing with the bull gear 146 and driven by the spindle speed transmission 100. From the feed rate transmission portion 200 the output shaft 169 is driven through a set of back gears 202 and the direction and traverse transmission portion 201.

The direction and traverse transmission 201 is for the purpose of selecting either feed or rapid traverse and either forward or reverse direction of translation. To this end, the feed transmission 200 and back gears 202 drive a shaft 204 which in turn drives a train of pick-off gears 205 and thereby a shaft 206 and an input gear 207 coupled to the selector transmission 201. This gear train thus provides a multiple feed rate input to the selector transmission portion 201.

For obtaining a high speed traverse rate as distinguished from the multiple feed rates obtained through the multi-speed transmission portion 200, the traverse motor 167 drives a shaft 210 and input gear 211 also coupled to the selector transmission portion 201.

Feed or traverse is selected by a pair of disc clutches 213, 214, respectively, for clutching a selected input gear 207 or 211 to a shaft 215 and thereby drive a pair of feed-traverse gears 216 and 217.

When the feed or traverse speed has been selected, the direction of feed is determined through a reversing gear train generally indicated at 219. This gear train comprises a pair of gears 220, 221 adapted to be selectively clutched to a shaft 222 carrying an output gear 224 by respective disc clutches 225, 226. The gear 220 is meshed directly with gear 216 for forward movement while gear 221 provides a reverse movement by meshing with gear 217 through a third idler gear 228. The output of the feed transmission from gear 224 is supplied to the output shaft 169 by means of a driven gear 229 thereon.

By selecting either a feed rate as determined by the feed transmission 200 and driven by the speed transmission 100 or, alternatively, a traverse rate from traverse motor 167 and also by determining the direction of feed by selecting forward or reverse with the reversing transmission portion 219, the output shaft can be driven at a large number of different feeds and in either forward or reverse direction.

*Electric Circuits*

The hydraulic circuit solenoid valves, the electric driving motors, and the various switch relays and the like used in the control of the machine tool described above are operated from the control panels 52, 53, 54 fixed to the headstock 50 (FIG. 1). The switches carried on these panels are, for obvious reasons, grouped according to the machine element which they control. In the present instance three main groups are provided for: the spindle and underarm (52); the column (53); and the headstock (54).

The "spindle" and "underarm" group of switches includes: a start switch S; a three position, run-jog-shift switch S1 which serves respectively to operate the spindle running circuit, the spindle jogging circuit, or the spindle transmission clutch gear shifting circuit; a two-position, spindle rotation direction control switch S2; a two-position control station switch S3 for operating the spindle either from the main control panels on the headstock or from a portable control panel at a remote point on the machine; a three-position, off-semiautomatic-automatic shaping cycle switch S4 for selecting the type of operation desired when using the underarm as a shaper; a three-position out-neutral-in spindle feed direction selector switch S5; a normally open traverse switch S6 serving, when depressed, to initiate traverse of the spindle or underarm; a two-position, off-on spindle clamp switch S7; a two-position off-on underarm clamp switch S8; and a normally closed emergency stop pushbutton switch S9 serving, when open, to stop the entire machine.

The feed transmission 166 is designed to provide a large number of cutting feed rates along with a traverse rate. One purpose of latter rate is for rapidly translating the spindle or the underarm to the vicinity of the cutting position, at which point traverse rate is stopped and the feed rate is initiated. When the spindle drive is started, by pushing the start switch S, which in turn energizes the spindle drive motor 59 to rotate the spindle, the feed transmission is simultaneously energized to drive the spindle or the underarm at a selected feed rate as determined by an appropriate feed rate selector dial 299 on the control panel 55. When the traverse button S6 is pushed, a solenoid valve SV2 is energized which declutches the feed rate portion of the transmission 166 (by any suitable clutch mechanism, not shown) and the traverse motor 167 is energized to translate the spindle at the rapid traverse rate. When the traverse switch button is released the spindle feed resumes at its previous rate.

The fed transmission includes feed clutches which are hydraulically actuated under the control of electric solenoid valves SV3 and SV4. When valve SV3 is energized, for example, pressure fluid is applied to engage a feed clutch for moving the spindle outwardly; on the other hand, valve SV4 controls the application of pressure to a second clutch which, when engaged, moves the spindle inwardly. These clutches can be of any appropriate type which are disengaged when the accompanying solenoid valve is deenergized.

Inner and outer limits of travel of the spindle are provided by suitable limit switches (not shown) which serve to declutch the feed transmission by deenergizing electric solenoid valves SV3 or SV4. A further control including a limit switch (not shown) is provided for stopping spindle motion short of its inner or outer limit. In any case, it is possible to run the spindle in the opposite direction off of the limit switch with or without reversing its direction of rotation. The underarm will also be operated by the inner and outer limits as determined by appropriate limit switches (not shown). The outer limit of the underarm may be determined by the same outer limit switch of the spindle, the inner limit switch of the spindle being held inoperative to permit the spindle to remain fully retracted when the underarm alone is used.

The column and headstock groups of switches include the usual start, stop and direction switches, as well as speed potentiometers 300, 301.

The portable control station (not shown) is a substantial duplicate of the spindle control panel with the exception of the gear shifting provisions and the shaping cycle switches. The purpose of this portable control station is to enable the operator to dismount from his platform adjacent the headstock to have closer view of the work. The portable panel may either be connected to the main headstock through a headstock cable or may rest on a stand adjacent the worktable. This duplicate system of control is simply paralleled with the main system and operates in an identical manner.

A number of electro-magnetically controlled relays and contacts are included in the control circuits (FIGS. 9 and 10) and are designated at R1, R2, R3, etc. In each case the respective contacts of these devices are designated by appending the additional designation $a$, $b$, $c$, etc. Thus, the contacts of relay R1 are designated R1$a$, R1$b$, etc.

The complete electrical circuit for controlling the operation of the spindle and underarm feeds, as well as the column and headstock traversing movements, has not been shown as the present invention is not concerned with this circuit in its entirety. The present invention is concerned with that portion of the electrical control circuit which is used when the underarm is being used for a shaping operation. This feature is directed to automatically indexing or traversing the column after each shaping cycle of the underarm in order to accomplish a cutting operation over a surface of a workpiece.

In accordance with one feature of the present invention, a shaper head (not shown) consisting of a clapper box and a single point shaping tool can be mounted on the end of the underarm 72 for performing shaping cuts on a workpiece when the underarm is reciprocated in and out of the headstock 50. In performing such operations, however, it is desirable to automatically feed the tool laterally of the workpiece in small increments so that successive cuts can be made without stopping the machine. It is, of course, possible to reciprocate the tool by moving the column on which the headstock is mounted by means of a hand crank. This leads to inaccuracies in the finished product and wastes a lot of time and energy on the part of the operator. It is, therefore, desirable to rotate automatically the column drive motor 317 (FIG. 10) to move the column.

In performing the shaping operation, the underarm having the clapper box and tool attached thereto, is moved out of the headstock across the workpiece. At the end of the cut the underarm is reciprocated inwardly and at the innermost point of underarm travel the column is indexed a fixed amount to present a new portion of the workpiece to the cutting tool on the underarm. This is accomplished in accordance with the present invention by the electrical control circuit shown in FIGS. 9 and 10. The purpose of this circuit is, when connected across electric supply lines L1 and L2, to control the out and in movements of the underarm as well as the indexing movement of the column.

In order to perform the shaping operation automatically, the shaping cycle switch S4 on the headstock is set to the automatic shaping position. The underarm clamp is then released by the foot pedal 76 and the clamp switch S8. The foot pedal is stepped on by the operator thereby closing the limit switch LS15 (FIG. 1). The underarm feed clutch 172 is then engaged, by moving the selector lever 192, to the underarm drive screw 95 (FIG. 6), simultaneously disengaging the spindle feed screw clutch 171 and closing the limit switch LS9 associated with the shifter fork 186.

To determine outer and inner limits of travel of the underarm when it is used for shaping, adjustable limit switches including an outer limit switch LS13 and an inner limit switch LS14 are mounted in the path of underarm travel (FIG. 1) for determining the movement of the underarm between its limits. In this particular instance the limit switches are operated by a pair of dogs 313 and 314 adjustably mounted on a dog ring 315 geared to the underarm feed mechanism (FIG. 1). The limit switches LS13 and LS14 are shown schematically in FIG. 8 for purposes of illustrating their action as outer and inner limit controls.

The underarm is translated in the shaping operation by the traverse portion of the feed transmission 166. In this operation, actuation of the traverse switch S6 energizes solenoid valves SV2 and traverse motor 167. Valve SV2 energizes the feed transmission to the traverse speed and declutches the feed rate portion operatively connected to the spindle drive transmission through gear 168. The direction of underarm movement is determined by appropriate clutches in the transmission under the control of solenoid valves SV3 and SV4 as described above. When valve SV3 is energized, pressure fluid is applied to the appropriate feed clutch for moving the underarm outwardly; on the other hand, valve SV4 controls the application of pressure fluid to the feed clutch for moving the underarm inwardly.

When the underarm reaches its preset inner or outer limit of travel as determined by the limit switches LS13 and LS14, its direction is automatically reversed as will be described in greater detail below. The operation limit switch can be adjusted, of course, by positioning the dogs 313 and 314 on the dog ring 315.

Figure 9:
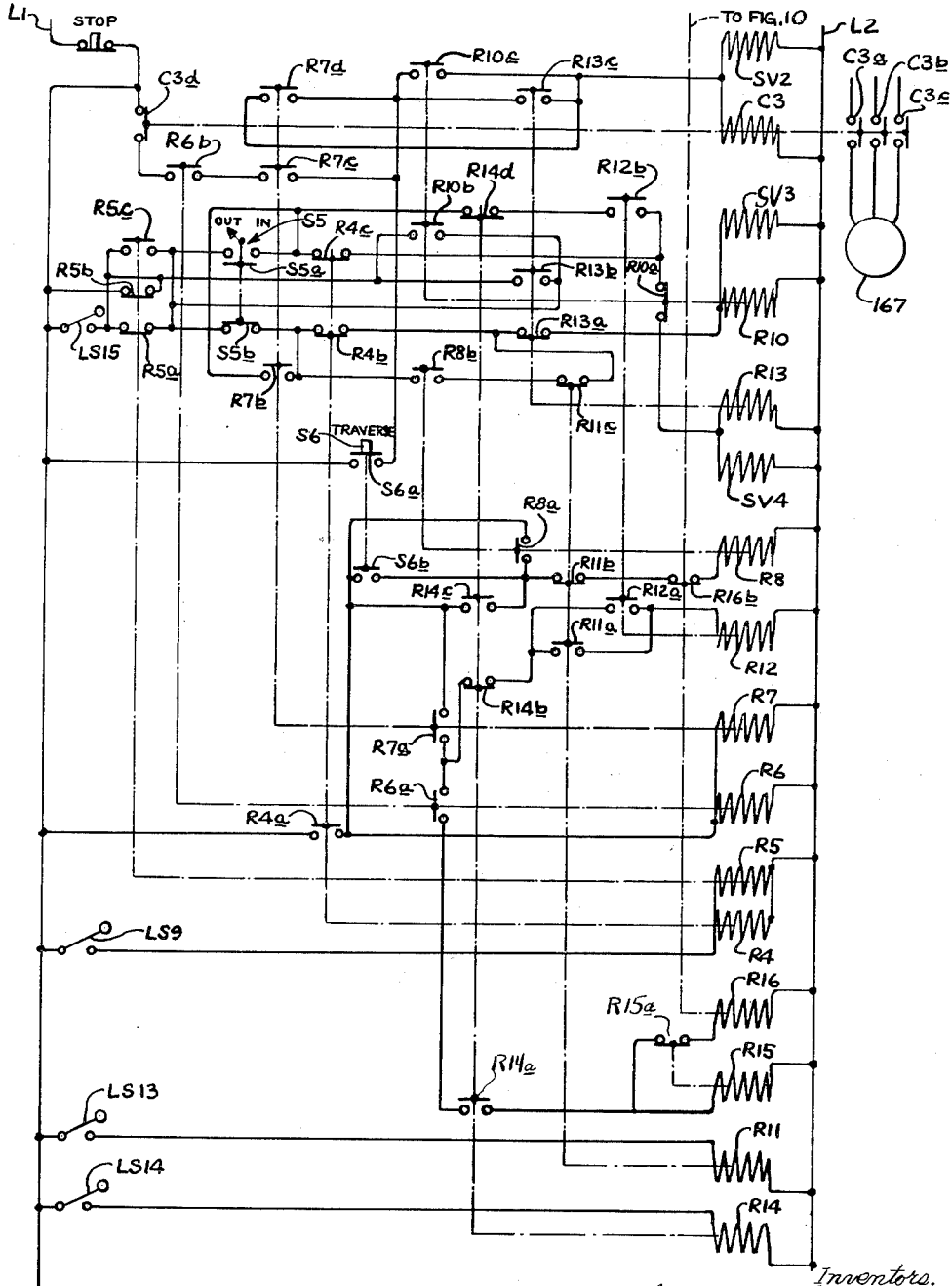
FIG. 9 is a wiring diagram showing that portion of the electrical control circuit employed when the headstock is used for shaping operations.

Referring to FIG. 9, when limit switch LS9 is closed by engaging the underarm drive clutch, relays R4 and R5 are energized and remain energized for as long as LS9 is closed and the underarm feed drive is engaged. Under these conditions contacts R4a and R5c are closed while contacts R4b, R4c, R5a, and R5b are open. Relays R6 and R7 are thereby energized and their associated contacts are closed. The circuit is now set up for automatic shaping operations.

To initiate operation of the shaping cycle, the traverse button S6 is depressed to close switch contacts S6a and S6b.

This energizes relays R8 and R10 which in turn close the circuits to underarm feed solenoid SV3 (L1—R5c—S5b—R8b—SV3—L2), the feed rate selector solenoid SV2 and the contactor C3 of the underarm drive motor 167 (L1—S6a—R10c—C3/SV2—L2).

Energization of contactor C3 closes interlock contact C3d and the motor contacts C3a, C3b, C3d to rotate the motor 167 in the righthand direction. The underarm feeds outwardly of the headstock and the shaping tool performs a shaping cut on the workpiece adjacent the headstock.

To return the underarm at the completion of the shaping cut, limit switch LS13 is closed by the dog 313 on the dog ring 315 geared to the underarm drive. When closed, the outer limit switch LS13 energizes relay R11 to break the circuit to the drive clutch solenoid valve SV3 by opening relay contact R11c. Outward movement of the underarm stops and inward movement begins as relay R12 is energized (L1—R4a—R7a—R11a—R12—L2) and feed-in clutch solenoid valve SV4 is energized (L1—R5c — S5b — R7b — R12b — R10a — R13/SV4—L2). As R13 is energized, contact R13c holds contactor C3 energized, and the underarm drive motor 167 continues to rotate in the righthand direction to traverse the underarm inwardly. Relay contact R12a interlocks R12 in the circuit. Thus, when limit switch 13 is opened as the underarm begins its return stroke, relay R12 and the clutch solenoid valve SV4 remain active. The underarm moves inwardly until it completes its return stroke and the dog 314 on the dog ring 315 engages the inner limit switch LS14.

For purposes of automatically indexing the underarm shaper, the column drive motor 317 is started to shift the column carrying the underarm in response to the completion of the return stroke of the underarm shaper. The indexing distance is desirably determined by the length of time D.C. current is applied to the drive motor 317. This is accomplished by a timer circuit including a timed-to-open relay R15 and contacts R15a in series with the starter relay R16 for the motor.

Referring to FIG. 10, the column drive control circuit comprises the drive motor 317 and a speed and direction control unit 318 connected in series with the motor across D.C. lines L3 and L4. Closing starter relay contacts R16a initiates operation of the drive motor for indexing the column. When relay contact R15a opens after a predetermined time delay, starter relay R16 is de-energized and the column drive ceases. The length of time relay R15 is closed thus determines the index distance of the column.

As the underarm closes limit switch LS14, relay R14 closes contacts R14a to energize relays R15 and R16 and initiate the column indexing movement. When the column has been indexed the desired amount, the shaping cycle is repeated.

Means are provided to automatically renew the shaping operation by energizing the feed-out clutch solenoid valve SV3. One means comprises a relay contact R14c in parallel with the traverse button contact S6b, and serving, when closed by relay R14 to energize relay R8 and thereby solenoid valve SV3. The underarm, being at its innermost limit of travel during the indexing step, holds limit switch LS14 closed. When the outward stroke of the underarm begins, LS14 is opened and the shaping cycle is repeated.

Summary

It is believed that it would be helpful to summarize the features of the improved headstock described above. This headstock 50 is adapted to be mounted on the machine tool column 62 and carries journalled therein for rotary movement a sleeve 57 carrying an axially splined spindle 56. Beneath the sleeve and spindle assembly and in an integral portion of the headstock housing is an underarm 72 axially translatable into and out of the headstock. A thirty-two speed transmission 100 is provided for rotating the spindle sleeve 57 and a multi-speed transmission 166 is provided for axially translating or feeding the spindle and the underarm.

The spindle speed drive transmission 100 comprises basically a constant speed reversing type motor 59, an eight-speed change constant mesh transmission 101, a three-speed planetary transmission 102, and a two-speed transmission 103 including a high-speed gear 148 and a bullgear 146. Shifting of the eight-speed transmission 101 is accomplished by hydraulically actuated disc clutches 108, 109, 122, 123, 131, 132 controlled by a selector dial on the headstock face. The three-speed planetary transmission 102 and the two-speed transmission 103 is shifted by hydraulic actuators 167, 168 respectively which are coupled to the shiftable elements or gear clutches of each transmission by conventional shifter rods and forks and are controlled by the speed selector dial and valve 204. Speed changes in the planetary two-speed transmissions can be preselected by setting the proper control valve dial to the desired speed range at any time. The shift is then accomplished by manually depressing an electrical control shift button on the control panel so as to energize the solenoid valve SV1 and apply pressure fluid to the actuators as determined by the control valve.

An improved spindle or underarm feed measuring device 194 has been provided which is geared directly to the feed transmission. The feed transmission is provided with a ball bearing nut and screw type feed mechanism in both the spindle and the underarm. It should be pointed out that feed mechanisms of this type, even though similar to a nut and screw arrangement, are relatively frictionless and the spindle or underarm can be moved in and out of the headstock even when the respective feed screw is not positively driven. The underarm and the spindle can thus be fastened together and, if a feed thrust is applied to one, the other will be pulled to follow the one to which the thrust is applied.

A machine tool equipped with a headstock of the foregoing description is useful for many machining operations including both boring, drilling, milling as well as the added operation of shaping. This shaping operation is performed by the underarm, and a control circuit for both reciprocating the underarm and indexing the column along its ways in order to traverse the underarm along the workpiece. A suitable electrical circuit is provided which may be adjusted to control the amount of indexing of the column, making the shaping operation completely automatic.

This application is a division of application Serial No. 608,061, filed September 5, 1956, now Patent No. 2,984,159, issued May 16, 1961.

We claim as our invention:

In a horizontal boring, milling and drilling machine, the combination comprising a vertical column mounted for translation on horizontal ways, a drive motor for translating said column on said ways, a headstock mounted for vertical movement on said column, a drive motor for said headstock, an underarm mounted in said headstock for reciprocation into and out of the same, a feed transmission in said headstock, means operatively connecting said feed transmission and said underarm for reciprocating said underarm when said transmission is rotated by said headstock drive motor, means for reversing the direction of translation of the underarm, and a control circuit for controlling said underarm to perform underarm shaping operations, said circuit comprising, in combination, an electric circuit including a start button for initiating operation of said headstock drive motor to reciprocate said underarm, an outer limit switch closed when said underarm reaches a predetermined outermost position, an inner limit switch closed when said underarm reaches a predetermined innermost position, a first control relay energized when said outer limit switch is closed for reversing the direction of movement of the underarm, a second control relay energized when said inner limit switch is closed for reversing the direction of movement of said underarm and for energizing an indexing relay, said indexing relay when energized stopping said headstock drive motor and thereby movement of the underarm and energizing said column drive motor for indexing said column transversely of the path of movement of said underarm, and a time-day-open relay operative in response to energization of said second control relay for determining the length of time said indexing relay remains energized and thereby the amount said column is indexed, outward movement of said underarm being initiated by said second control relay when said index relay is deenergized by the opening of said time-delay-open relay, whereby the shaping cycle of the underarm is automatically repeated.

References Cited in the file of this patent

UNITED STATES PATENTS

| | | |
|---|---|---|
| Re. 18,834 | Ward | May 23, 1933 |
| 685,347 | Richards | Oct. 29, 1901 |
| 1,215,514 | Frede | Feb. 13, 1917 |
| 1,518,707 | Sleeper | Dec. 9, 1924 |
| 2,548,188 | Armitage et al. | Apr. 10, 1951 |
| 2,730,021 | Gallimore et al. | Jan. 10, 1956 |
| 2,749,812 | Wetzel | June 12, 1956 |
| 2,847,911 | Stephan | Aug. 19, 1958 |
| 2,890,629 | Schurger et al. | June 16, 1959 |

FOREIGN PATENTS

| | | |
|---|---|---|
| 434,566 | Great Britain | Sept. 4, 1935 |